United States Patent [19]

Nakamura

[11] Patent Number: 4,921,557

[45] Date of Patent: May 1, 1990

[54] FABRICATION BY FILAMENT WINDING WITH AN ELASTOMERIC MATERIAL

[75] Inventor: Wayne H. Nakamura, San Jose, Calif.

[73] Assignee: The United States of America as represented by the Secretary of the Navy, Washington, D.C.

[21] Appl. No.: 209,143

[22] Filed: Jun. 13, 1988

[51] Int. Cl.⁵ ...................... B65H 81/00; B65H 81/02
[52] U.S. Cl. .................................. 156/169; 156/173; 156/189; 156/190; 156/191
[58] Field of Search ............... 156/169, 188, 170, 171, 156/172, 173, 189, 174, 190, 191, 428–431; 244/158 R; 60/200.1

[56] References Cited

U.S. PATENT DOCUMENTS

| 1,232,110 | 7/1917 | Sloper | 156/173 X |
| 3,210,228 | 10/1965 | Bluck | 156/173 X |
| 3,414,449 | 12/1968 | Beach | 156/173 |
| 3,616,078 | 10/1971 | Howard | 156/486 |
| 3,655,468 | 4/1972 | Bastone et al. | 156/189 X |
| 3,966,523 | 6/1976 | Jakobsen et al. | 156/173 X |
| 4,596,619 | 6/1986 | Marks | 156/188 X |
| 4,684,423 | 8/1987 | Brooks | 156/174 X |

*Primary Examiner*—Michael W. Ball
*Assistant Examiner*—Jeff. H. Aftergut
*Attorney, Agent, or Firm*—Harold M. Dixon; Kathleen S. Moss; Robert M. Wohlfarth

[57] ABSTRACT

This invention relates in general to fabricating fiber-reinforced membranes using elastomeric materials and, in particular, to a filament winding process suitable for fabricating flexible fiber-reinforced membranes for inflatable deployable or expandable structures capable of sustaining high structural loads or providing thermal insulation to the structure. The invention relates especially to a filament winding process for fabricating a flexible membrane which may be inflated to provide a conically shaped deployable nose fairing for a missile.

11 Claims, 3 Drawing Sheets

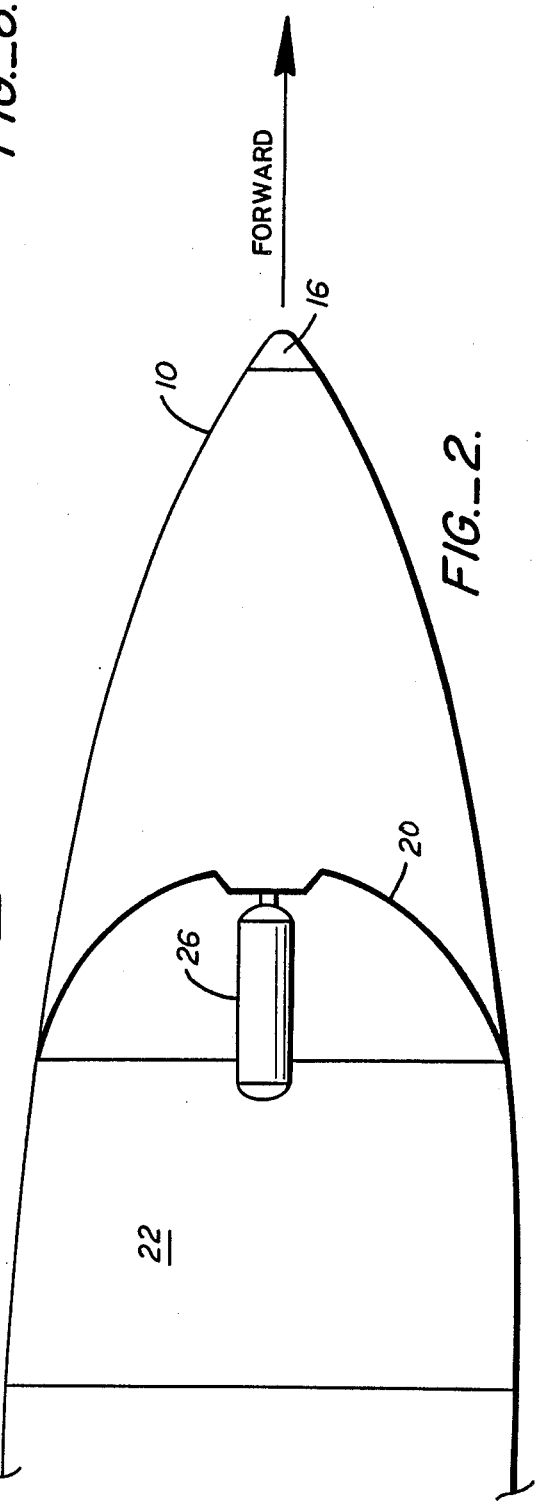
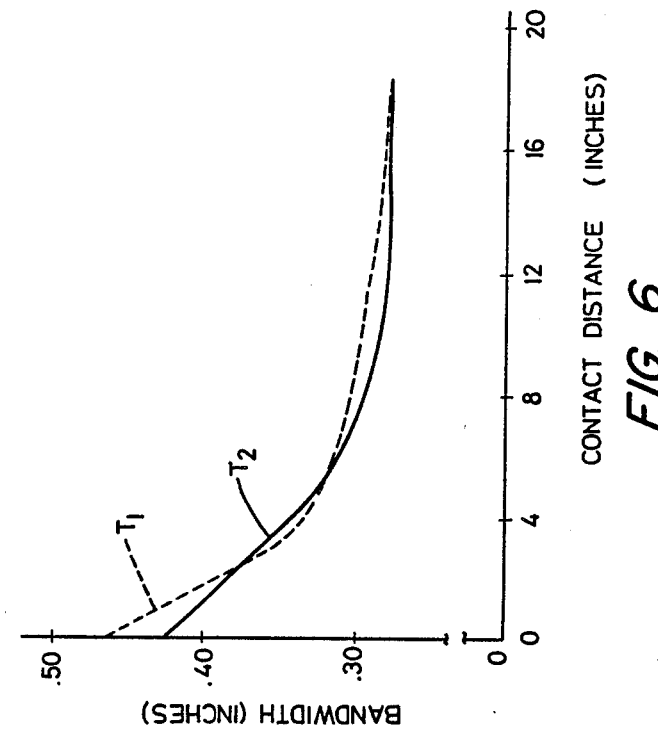
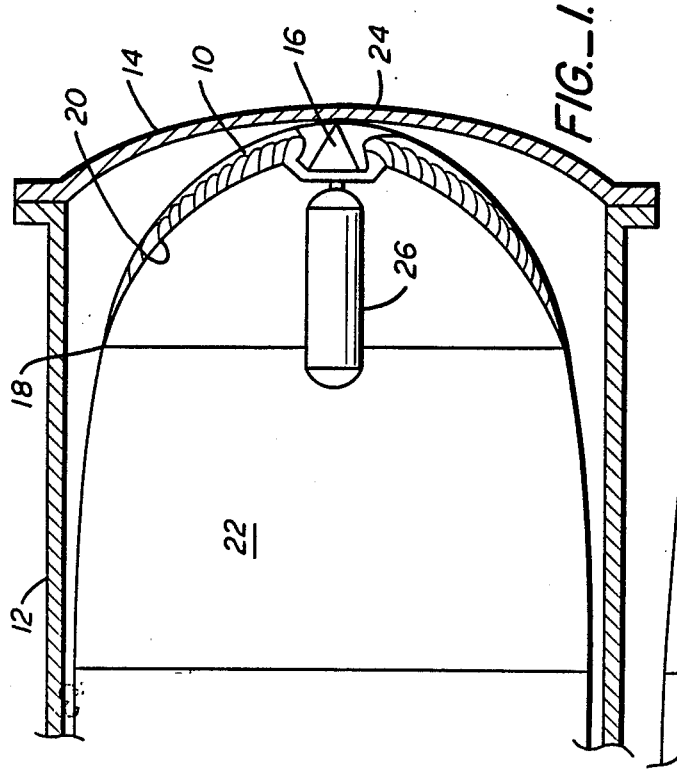

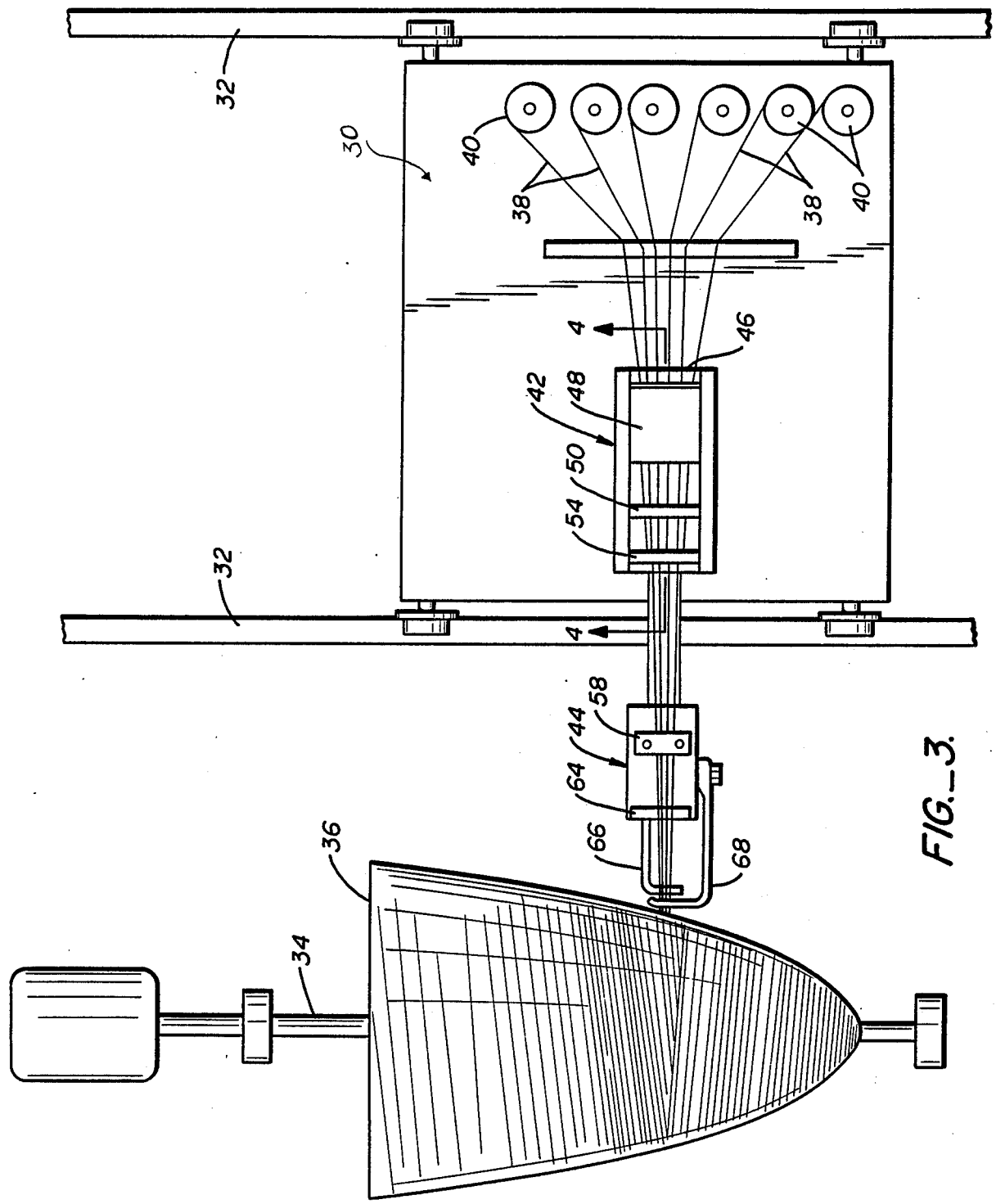
FIG._3.

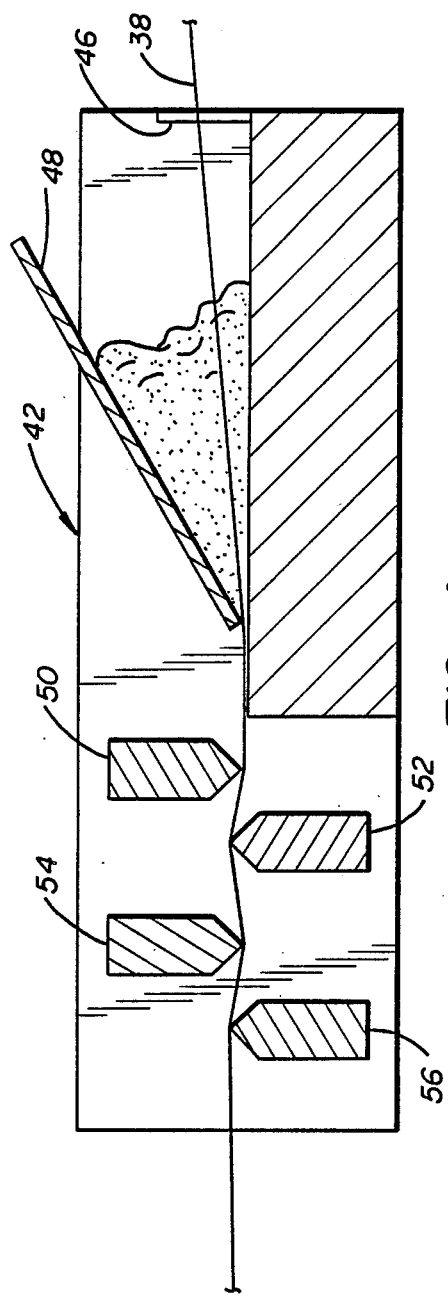
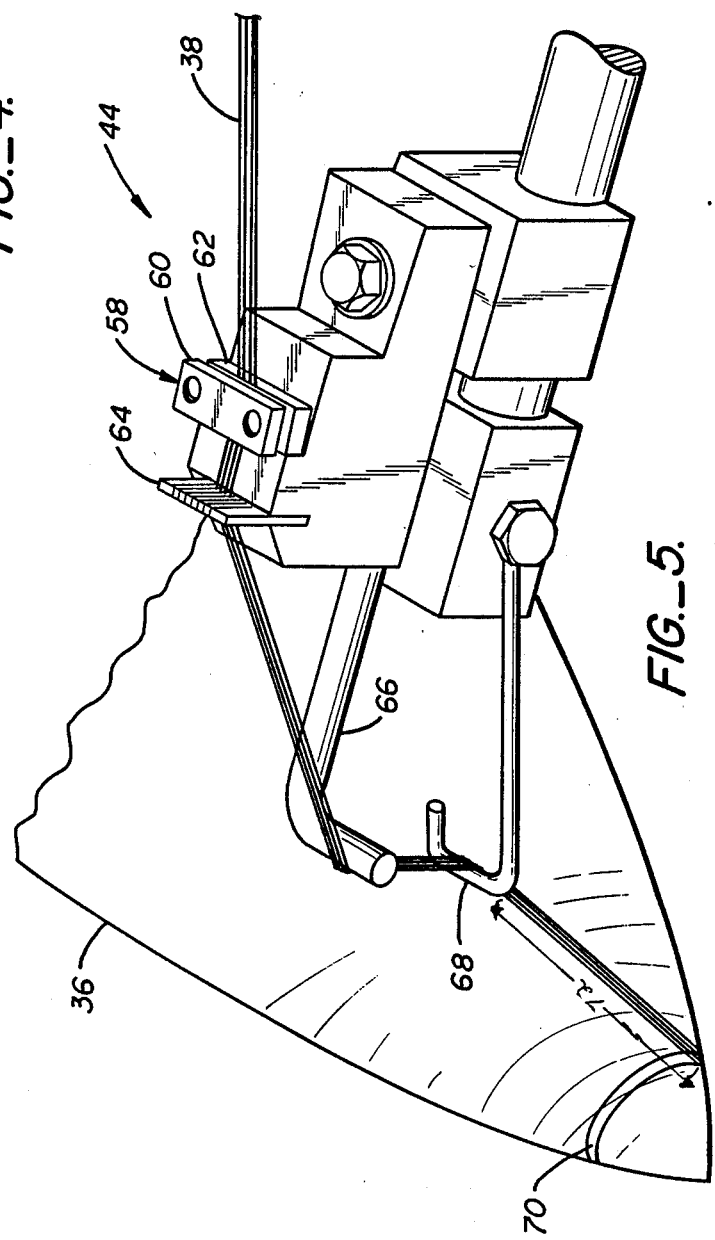

FABRICATION BY FILAMENT WINDING WITH AN ELASTOMERIC MATERIAL

BACKGROUND OF THE INVENTION

This invention relates in general to fabricating fiber-reinforced membranes using elastomeric materials and, in particular, to a filament winding process suitable for fabricating flexible fiber-reinforced membranes for inflatable, deployable or expandable structures capable of sustaining high structural loads or providing thermal insulation to a structure. The invention relates especially to a filament winding process for fabricating a flexible membrane which may be inflated to provide a conically shaped deployable nose fairing for a missile.

Inflatable, deployable, or expandable structures have been manufactured in the past by calendering an elastomeric material onto fabric. Structures produced by this method have not been entirely satisfactory because of the splicing necessary for fabrication. This is especially the situation in cases where the inflated structure is subjected to high loads. Splicing is generally required between pieces of the calendered material to provide the desired shape. The requirement for splicing increases manufacturing time and costs and results in areas of structural weakness at the splice joint.

Filament winding has been used to form pressure vessels or open-ended elements such as pipes and conduits. For example, see U.S. Pat. No. 3,047,191. However, producing an inflatable or expandable structure such as a missile nose fairing by filament winding presents unique problems. The membrane must have a high strength-to-weight ratio to be suitable for use on aerospace vehicles. The yarns must be sufficiently impregnated with the elastomeric material so as to provide maximum shear and tensile capability. Similarly, gaps between yarns resulting from the winding process must be minimized in the final wound laminate. Forming the membrane in a conical shape also presents a special problem in minimizing the gaps between yarns because of the constantly changing diameter of the structure. Furthermore, there is a tendency for the windings to slip from position during the manufacturing process in the nose area where the surface has a steep slope.

SUMMARY OF THE INVENTION

It is therefore an object of the present invention to provide an elastomeric membrane having a high strength to weight ratio.

Another object is to provide an elastomeric membrane which will maximize the shear and tensile capability of an elastomeric material.

Another object is to provide an elastomeric membrane suitable for forming an inflatable, deployable or expandable structure.

Another object is to provide an elastomeric membrane suitable for forming a conically shaped inflatable structure having a high strength to weight ratio.

Still another object is to provide for fabricating an inflatable, expandable or deployable structure by filament winding on an elastomeric material.

Yet another object is to provide a process for fabricating a high-strength conically shaped structure by filament winding on an elastomeric material.

Another object is to provide a process for fabricating an insulation layer for tanks, cylinders or other structures.

These and other objects are provided by a filament winding process in which multiple plies of yarns of resin-impregnated high modulus organic filaments are applied to a mandrel surface over base coats and intervening coats of elastomeric material. Considering the case where three plies are used, the first and third plies are applied using a steep helical winding method in which index winding steps are alternated with dead winding steps until the mandrel is covered with the resin-impregnated yarns. The second ply is fabricated by hoop winding the resin-impregnated yarns on a constant diameter cylinder to form gores of resin-impregnated yarns and applying the gores to the mandrel so that the yarns of the second ply are oriented transverse to the yarns of the first ply. The mandrel is rotated in a first direction during the application of the first ply and in the opposite direction during the application of the third ply. The tension of the yarns is controlled to provide maximum encapsulation of the organic filaments in the resin and to control the spacing between parallel yarns on the mandrel.

Other objects and many of the attendant advantages of the present invention can be readily appreciated by reference to the following detailed description when considered in conjunction with the accompanying drawings.

BRIEF DESCRIPTION OF THE DRAWINGS

FIG. 1 illustrates an inflatable nose fairing in its stowed configuration;

FIG. 2 illustrates an inflatable nose fairing in its deployed configuration;

FIG. 3 illustrates a filament winding apparatus for fabrication of fiber-reinforced membranes;

FIG. 4 illustrates an apparatus for impregnating the fibers with silicone rubber resin and for controlling the tension of the fibers;

FIG. 5 illustrates the fiber tension control apparatus at the payout end of the filament winding machine; and FIG. 6 illustrates the effect of yarn tension and contact distance on yarn bandwidth.

DESCRIPTION OF THE PREFERRED EMBODIMENT

The present invention is directed to a filament winding process for fabricating a fiber-reinforced membrane using elastomeric materials for inflatable, deployable or expandable structures such as an inflatable nose fairing for a missile. The invention will be described with particular reference to the fabrication of an inflatable nose fairing for purposes of illustration, but it will be understood that the filament winding process of the present invention can be employed in the fabrication of high-strength flexible membranes for use in various structures.

Referring now to the drawings, FIGS. 1 and 2 illustrate a conically shaped deployable nose fairing 10. FIG. 1 shows the inflatable nose fairing 10 in the stowed position in a missile launch tube 12 having a closure dome 14. The fairing must be constructed of a structural material having a high strength and modulus, minimal property degradation at elevated temperatures and low susceptibility to fiber damage. The fairing has a rigid nose tip 16.

The fairing 10 is joined to a rigid section of the missile body at junction 18 and folded onto a pressure bulkhead 20 so that it fits within the stowage envelope. The pressure bulkhead 20 is designed to sustain the inflation pressure, provide a surface upon which the fairing is folded, and serve as a cover for the payload disposed within section 22 of the missile. A protective cover 24, which is pyrotechnically separated to allow for inflation of the fairing, is provided for sustaining stowage loads and providing a hydrodynamic surface to minimize cavitation. A gas generator 26 is used to inflate the fairing 10 to the design pressure at the proper time after the missile is ejected from the submarine. FIG. 2 illustrates the missile in flight with the inflatable nose fairing 10 deployed.

The fabrication process involves alternately spreading layers of elastomeric material and winding filament yarns impregnated with elastomeric material on a mandrel of the desired configuration. Suitable yarns include graphite or carbon filaments, fiberglass, quartz yarns and high modulus organic filaments, particularly organic filaments of aramids and the like. Aramids include polybenzamides and the family of materials marketed by I. E. duPont under the registered trademark KEVLAR. A preferred filament especially suitable for the nose fairing is the aramid fiber marketed as KEVLAR 49.

Selection of a suitable elastomeric material entails evaluation of the following characteristics: viscosity, tear strength, shear strength, tensile strength, modulus cured stiffness and thermal properties. Especially suitable for the nose fairing is a silicone rubber composition sold by Dow Corning under the tradename "Dow Corning 93-076".

The impregnation of yarn with the elastomeric material comprises spreading the yarn into fibers and encapsulating the fibers in a resin formed of the elastomeric material, in this case a resin formed from silicone rubber. Complete encapsulation of the fibers is desirable as it increases the effective shear area and thus the shear capability of the filament wound laminate. The silicone rubber is diluted with a solvent to enable it to function as a liquid in a resin bath to impregnate the yarns. The minimum dilution amount is 15 percent by weight of solvent. The preferred dilution is 40 percent by weight which facilitates the yarn impregnation. Since the solvent flashes off as the rubber cures, too high a percentage of solvent (greater than 50 percent by weight) will cause insufficient silicone rubber to be applied to the yarns.

FIG. 3 illustrates a filament winding apparatus for fabrication of a fiber-reinforced membrane according to the present invention. The preferred apparatus employs a computer controlled winding machine including a carriage 30 traversing on rails 32 and a rotating shaft 34 for mounting a mandrel 36. A plurality of strands of yarns 38 are run from feed spools 40 (through tension compensating devices not shown) to a resin bath 42 described in more detail in connection with FIG. 4. After passing through the resin bath 42, the yarns are fed through a payout apparatus 44, best shown in FIG. 5, for winding on the mandrel 36.

FIG. 4 illustrates a simple and effective method for impregnating the yarns 38 with the silicone rubber elastomeric material. A plurality of strands of the yarn (six strands in this application) are run from the feed spools 40 to the resin bath 42. The yarns 38 initially pass through a comb 46 for separating the individual yarns as they enter a resin application chamber 48 of the resin bath 42 where the silicone rubber resin is contained. After passing through the resin application chamber 48, the yarns are directed past a series of four blades covered with or fabricated with a non-stick surface such as TEFLON. The yarns 38 pass under the initial blade 50 which acts as a baffle to regulate the amount of silicone rubber resin applied to the yarn. The yarns are then directed over blade 52, under blade 54, and over blade 56 to impregnate the individual fibers and remove excess resin. This method minimizes the yarn tension required for maximum encapsulation of the fibers. The tension experienced by the yarns 38 can be varied by adjusting the vertical positions of the blades 50, 52, 54 and 56 to modify the direction change that the yarns undergo in the resin bath 42.

The first step in the fabrication process is to provide for the removal of the completed part from the mandrel 36. It will be recognized that there are many techniques known to those skilled in the art for providing for the removal of a part from a mandrel including disassembly of the mandrel; however, in this case involving a conically shaped part, a preferred method is to first cover the mandrel with a release coat and then wind the first section of the large diameter end of the mandrel with a small diameter nylon cord. The part is then fabricated over this release layer and cord. To remove the finished part, the nylon cord is slipped out, allowing the part to easily slide off the mandrel.

After providing for the release of the part from the mandrel, the first step in the fabrication of the part is the application of a thin coat of silicone rubber on the mandrel surface (on the release cord and the release coat in this case). Preferably, this coat is applied by squeegeeing to yield a layer about 20-30 mils thick. The importance of this layer and the application process used will be described in more detail hereinafter. This silicone layer is then allowed to cure to a tacky state.

The next step is applying a first ply of high modulus organic filament impregnated with silicone rubber to the rubber surface using a steep helical winding method. The steep helical winding is accomplished using a method called index winding, which involves laying fibers on a mandrel in one direction of the carriage movement, the carriage being that part of the filament winding machine which traverses back and forth. The high modulus organic filament yarns are attached forward of the tip and wound by moving the carriage at a set rate per mandrel rotation. Upon reaching the end of the mandrel, the yarns are cut and secured. The carriage movement is then reversed and returned to its initial position without laying fibers on the mandrel. This step is known as "dead winding". The yarns are then attached again forward of the tip and positioned adjacent to the previously wound band of yarns. The location of each band is preprogrammed into the winding machine computer and the index winding continued until the entire mandrel is wound.

The difference between steep helical winding and true hoop winding (90 degrees from the axis of rotation) varies with the diameter of the mandrel because of a uniform advance per mandrel rotation. Helical winding approaches true hoop winding as the diameter increases. The helical wind angle of the present embodiment is approximately 80 degrees at the maximum diameter of the mandrel. The carriage advancement rate per mandrel rotation actually determines the helical wind angle. Numerous rates are possible but for this specific application, three inches per mandrel rotation is preferred.

The yarn tension is an important variable in optimizing the winding process. The amount of yarn tension desired is determined by balancing two opposing factors. Reduced tension is desirable since it minimizes yarn slippage that occurs with hoop windings. On the other hand, increased yarn tension is desirable to facilitate the spreading and impregnation of the yarns, to minimize the "wandering" of yarns during the winding process, to allow the yarns to "hold on" to the rubber after being wound and to spread the yarns to obtain a maximum bandwidth. The problem of hoop winding slippage, common in filament winding processes, is eliminated by using the steep helical wind angle, varying the rubber tackiness (degree of cure) and thickness, making grooves in the rubber surface and reducing the yarn tension.

The characteristics of silicone rubber are a major factor in controlling the amount of yarn slippage. First of all, the rubber tackiness can be varied by changing the degree of cure to obtain a rubber surface which will allow the yarns to "hold on" during winding. The degree of slippage is also dependent upon the rubber thickness, the preferred rubber surface being about 20-30 mils thick. Additionally, since surface irregularities cause increased slippage, the silicone rubber layer is carefully squeegeed to obtain as smooth a surface as possible. This step is followed by creating shallow grooves on the silicone rubber surface at the proper wind angle by using a brush. These grooves provide additional support to the yarns.

As shown in FIG. 5, yarn tension is reduced by shifting the primary tension control from the feed spools' compensating tension devices (not shown) to a tension clamp 58 located just before the payout apparatus 44. The tension clamp 58 includes blocks 60 and 62 having opposing flat TEFLON surfaces for adjusting the clamp-on force applied to the yarns 38 as they pass between the opposing surfaces after leaving the resin bath 42. The tension clamp 58 provides a "fine tuning" tension control for adjusting the tension to prevent the yarns 38 from wandering during winding, allow the yarns to "hold on" to the rubber after it is wound, and reduce yarn twisting. The tension clamp 58 also provides further impregnation of the yarns with the resin. After the passing through the tension clamp 58, the resin impregnated yarns 38 are fed through a comb 64 and pass over a threaded guide bar 66 and under a payout guide bar 68 prior to being wound on the surface of the part 70. The changes in direction which the yarns 38 undergo between the filament feed spools 40 and the payout guide bar 68 can also be minimized to reduce yarn tension.

The position difference between the payout guide bar 68 and the threaded guide bar 66 finely controls the yarn tension to provide the desired bandwidth of the yarn. The bandwidth is dependent on two main factors which are influenced by the yarn tension. First is the contact distance 72 from the payout guide bar 68 to the part 70. Second is the configuration of the payout guide bar. The contact distance 72 is the major influence on the bandwidth of the yarn 38. The plot of FIG. 6, for a constant diameter cylinder, illustrates that when contact distance is small (less than five inches in this embodiment), the bandwidth will increase with tension and with decreasing contact distance. (T indicates yarn tension and T1 is greater than T2.) The bandwidth will increase with decreasing contact distance more rapidly when the tension is higher. For larger contact distances, the tension has less effect on the bandwidth.

This combination of the steep helical winding angle, silicone rubber tackiness, grooves in the silicone rubber surface and reduction of the filament yarn tension work to provide control of the spacing between parallel yarns on the mandrel windings.

The helical winding step is followed by application of a thin coat of silicone rubber over the first ply. As before, the silicone rubber is applied by squeegeeing. This coat is preferably about 10 mils thick, and is allowed to cure to a tacky state.

The next ply consists of longitudinal fibers applied by fabricating a plurality of gores of unidirectional fibers and manually laying them up onto the mandrel. A unidirectional tape is fabricated by winding high modulus organic filament hoop yarns on a constant diameter cylinder. The tape is then removed from the cylinder and the gores are trimmed from it, using a template. These gores are then manually laid on the part and smoothed. The part is then vacuum bagged to eliminate any voids resulting from the manual layup.

Next, a 20-30 mils thick coat of silicone rubber is applied in the manner described earlier and allowed to cure to the required tackiness. A second helically wound ply is then applied to the rubber coating. This final helical winding is applied with the mandrel rotating in the opposite direction to that employed in applying the first helical winding, i.e., the mandrel is rotated clockwise for one ply and counter-clockwise for the other ply. In this manner, a balanced layup is obtained when the part is completely wound.

The final fabrication step is the application of the silicone rubber thermal insulation. There are several methods of applying insulation. However, the one best suited for use with this invention is the spraying method, in which the silicone rubber is sprayed directly onto the layup mold. This method is very simple, has good thickness control and is a process which can be automated. The part is first transported from the filament winding machine to a spray booth where the spraying is done. Then the part is manually rotated while simultaneously being sprayed with a spray gun. Alternately, the spraying can be done on a continuously rotating mandrel for better uniformity and for automation. After the insulation is applied, the finished part is allowed to cure.

Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is:

1. A method for fabricating a conical shaped flexible fiber-reinforced membrane for providing an inflatable, deployable or expandable structure which is able to sustain high structural loads, which comprises the steps of:
   (a) applying a first coat of an elastomeric silicone rubber material on a conical shaped mandrel;
   ($a_1$) eliminating surface irregularities in said first coat of said elastomeric material on said conical mandrel by smoothing said first coat of said elastomeric material, and then partially curing the smooth coat of elastomeric material to a tacky state; and,
   (b) impregnating yarns of high modulus organic filaments with a resin formed from said elastomeric silicone rubber material and applying a first ply of said impregnated yarns to said conical mandrel using a steep helical winding method;

(c) applying a second coat of said elastomeric silicone rubber material over said first ply;

(c₁) eliminating surface irregularities in said second coat of said elastomeric material on said conical mandrel by smoothing said second coat of said elastomeric material, and then partially curing the smooth coat of elastomeric material to a tacky state; and, (d) impregnating yarns of said high modulus organic filaments with said resin formed from said elastomeric material of step (b) and applying a second ply of said impregnated yarns to said conical mandrel;

(e) applying a third coat of said elastomeric silicone rubber material over said second ply;

(e₁) eliminating surface irregularities in said third coat of said elastomeric material on said conical mandrel by smoothing said third coat of said elastomeric material, and then partially curing the smooth coat of elastomeric material to a tacky state; and, (f) impregnating yarns of said high modulus organic filaments with said resin formed from said silicone rubber elastomeric material of step (b) and applying a third ply of said impregnated yarns to said conical mandrel using a steep helical winding method;

(g) applying an insulating layer of said elastomeric silicone rubber material; and (h) curing said elastomeric material in said fabricated structure; said method being further characterized by said steep helical winding method providing for a plurality of index winding steps in which said impregnated yarns are laid on said conical mandrel in one direction of carriage movement, each index winding step being followed by a dead winding step in which the carriage movement is reversed and returned to its original position without laying fibers on said conical mandrel, said index winding steps continuing until said mandrel is covered.

2. The process of claim 1 wherein the application of said second ply of said impregnated yarns comprises:

(a) fabricating a plurality of gores of impregnated yarns in which said fibers are arranged in a single direction; and (b) applying said gores upon said mandrel so that the yarns of said second ply are oriented transverse to the yarns of said first ply.

3. The method of claim 1 wherein said smooth coat of partially cured silicone rubber in said first and third steps is treated to provide shallow grooves at the respective wind angle of said steep helical winding method.

4. The method of claim 1 wherein said first coat of silicone rubber elastomeric material is about 20-30 mils thick.

5. The method of claim 4 wherein said yarn of high modulus organic filaments is a yarn of aramids.

6. The process of claim 5 wherein said application of the first ply and said application of the third ply by steep helical winding method employs rotating the mandrel in a first direction during the application of the first ply and in the opposite direction during the application of the third ply.

7. The process of claim 6 wherein the application of said second ply of said impregnated yarns comprises:

(a) fabricating a plurality of gores of impregnated yarns in which said fibers are arranged in a single direction; and (b) applying said gores upon said mandrel so that the yarns of said second ply are oriented transverse to the yarns of said first ply.

8. The method of claim 7 wherein said smooth coat of partially cured silicone rubber in said first and third steps is treated to provide shallow grooves at the respective wind angle of said steep helical winding method.

9. The method of claim 8 wherein said yarns are not only impregnated but fully encapsulated with said elastomer.

10. The process of claim 9 wherein said plurality of gores are fabricated by hoop winding said impregnated yarns on a constant diameter cylinder.

11. The process of claim 1 wherein said application of said first ply and said application of said third ply by steep helical winding method employs rotating the mandrel in a first direction during the application of the first ply and in the opposite direction during the application of the third ply.

* * * * *